(12) United States Patent
Kawamoto et al.

(10) Patent No.: US 10,607,091 B2
(45) Date of Patent: Mar. 31, 2020

(54) OFF-ROAD VEHICLE AND GROUND MANAGEMENT SYSTEM

(71) Applicant: Kubota Corporation, Osaka (JP)

(72) Inventors: Kazuyoshi Kawamoto, Sakai (JP); Akira Tominaga, Sakai (JP); Yuji Ishii, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/835,619

(22) Filed: Dec. 8, 2017

(65) Prior Publication Data

US 2018/0314900 A1 Nov. 1, 2018

(30) Foreign Application Priority Data

Apr. 26, 2017 (JP) ................................. 2017-087350

(51) Int. Cl.
*G06K 9/00* (2006.01)
*G05D 1/02* (2020.01)
*B60R 1/00* (2006.01)
*B60R 11/04* (2006.01)

(52) U.S. Cl.
CPC ............ *G06K 9/00791* (2013.01); *B60R 1/00* (2013.01); *B60R 11/04* (2013.01); *G05D 1/0246* (2013.01); *G05D 1/0274* (2013.01); *B60R 2300/302* (2013.01); *B60R 2300/8086* (2013.01); *G05D 2201/0213* (2013.01)

(58) Field of Classification Search
None
See application file for complete search history.

(56) References Cited

U.S. PATENT DOCUMENTS

| 2005/0046584 A1* | 3/2005 | Breed | B60C 11/24 340/13.31 |
| 2006/0055776 A1* | 3/2006 | Nobori | B60R 1/00 348/142 |
| 2010/0157061 A1* | 6/2010 | Katsman | G07C 5/008 348/149 |
| 2015/0145995 A1* | 5/2015 | Shahraray | H04W 4/70 348/148 |
| 2017/0021768 A1* | 1/2017 | Jaegal | B60Q 1/525 |

(Continued)

FOREIGN PATENT DOCUMENTS

| JP | 2009090718 A | 4/2009 |
| JP | 2011146065 A | 7/2011 |
| JP | 2015229433 A | 12/2015 |

*Primary Examiner* — Chikaodili E Anyikire
(74) *Attorney, Agent, or Firm* — The Webb Law Firm (57) ABSTRACT

An off-road vehicle that travels on the off-road ground includes: a sensor group configured to detect unevenness of the ground; a camera configured to capture the unevenness of the ground; a ground unevenness degree calculation unit configured to calculate a ground unevenness degree indicating an unevenness degree of the ground based on an input parameter; an input parameter setting unit configured to set, as the input parameter, data selected from among data detected by the sensor group and image data captured by the camera; an unevenness-position data generation unit configured to associate the actual vehicle position with the ground unevenness degree to generate ground unevenness-position data; and a data storage unit configured to store the ground unevenness-position data.

8 Claims, 4 Drawing Sheets

(56) References Cited

U.S. PATENT DOCUMENTS

| | | |
|---|---|---|
| 2017/0082757 A1* | 3/2017 | Kunkel .................... G01S 19/40 |
| 2017/0261315 A1* | 9/2017 | Yamaguchi ............. G01C 21/28 |
| 2017/0350712 A1* | 12/2017 | Tateishi ................. G01S 7/4808 |
| 2018/0224275 A1* | 8/2018 | Kinoshita ........... G06K 9/00791 |
| 2018/0314900 A1* | 11/2018 | Kawamoto ......... G06K 9/00791 |

\* cited by examiner

OFF-ROAD VEHICLE AND GROUND MANAGEMENT SYSTEM

CROSS-REFERENCE TO RELATED APPLICATION

This application claims priority to Japanese Patent Application No. 2017-087350 filed Apr. 26, 2017, the disclosure of which is hereby incorporated in its entirety by reference.

BACKGROUND OF THE INVENTION

1. Field of the Invention

The present invention relates to an off-road vehicle that travels on the off-road ground, and a ground management system using the off-road vehicle.

2. Description of the Related Art

JP2015-229433A discloses a road surface state detection device that detects the state of a travel surface of a road. This road surface state detection device includes: an acceleration sensor that rotates together with a wheel of the vehicle to detect the acceleration exerted on the wheel; a road surface state estimation unit that estimates the road surface state based on the acceleration value detected by the acceleration sensor; a GPS (global positioning system) device that detects the position of the vehicle; a transmitter that transmits information regarding the road surface state estimated by the road surface state estimation unit and information regarding the position of the vehicle detected by the GPS device to a server connected via a network; and a receiver that receives road surface state information transmitted by the server. When the vehicle travels on a road, the road surface state detection device estimates a road surface state based on a value detected by the acceleration sensor, and transmits the estimated road surface state information and vehicle position information from the transmitter to the server. Accordingly, the server stores road surface state-related information transmitted from a plurality of vehicles, and thus if the receiver receives the road surface state-related information stored in the server, then it is possible to acquire the state of a road surface on which the vehicle is to travel before the travel, and to perform driving that corresponds to the road surface state. Furthermore, it has been proposed to use not only a detected acceleration value but also a road surface image captured by a camera to estimate a road surface state such as cracks or the like.

JP2009-090718A discloses a safe travel system with which it is possible to easily prevent a vehicle collision on the road. In the safe travel system, braking distances of a subject vehicle and an in-front vehicle are calculated based on road surface data transmitted from a road surface data transmission means and the speeds of the subject vehicle and the in-front vehicle, a safe inter-vehicular distance between the subject vehicle and the in-front vehicle is calculated based on the calculated braking distances of the subject vehicle and the in-front vehicle, the safe inter-vehicular distance being a distance such that, when the in-front vehicle is operated to brake, the subject vehicle is stopped without colliding with the in-front vehicle, and a brake means is activated based on the calculated safe inter-vehicular distance and an actual inter-vehicular distance. Accordingly, it is possible to realize a safe inter-vehicular distance between the subject vehicle and the in-front vehicle based on the received road surface data. Various methods are conceivable as means for detecting road surface conditions. For example, a method has been proposed in which an image of a road surface is captured by a camera, reflected light from the road surface is subjected to spectroanalysis, and an object present on the road surface and its state are analyzed.

JP2011-146065A discloses an information system that provides the driver of a vehicle that is traveling on a road with information regarding a road surface state and weather information. The information system is constituted by an on-board system and a center-side information processing system. The on-board system includes: a slip information detection means for detecting slip-related information by detecting that the vehicle has slipped when a drive wheel of the vehicle has spun out on the road surface on which the vehicle is traveling and a device for adjusting the rotation driving force of the drive wheel has been activated to resolve the spin out; a vehicle position detection means for detecting position information regarding the position of the vehicle; a weather information detection means for detecting weather information regarding the road surface on which the vehicle travels; a communication transmission means for transmitting, when the slip detection means has detected that the vehicle has slipped, the vehicle slip-related information detected by the slip detection means, the vehicle position information detected by the vehicle position detection means, and the weather information detected by the weather information detection means to the center-side information processing system. The center-side information processing system includes: an information receiving means for receiving detected vehicle slip-related information, vehicle position information and weather information; and an information generation means for generating information regarding the road surface state and weather information, based on the detected vehicle slip-related information, the vehicle position information and the weather information that was received from the vehicle. The driver of the vehicle traveling on the road can use a display device to check the information regarding the road surface state and weather information transmitted from the center-side information processing system.

All of the systems for checking the road surface state according to the above-described three documents are configured to check the state of a road. Roads are subjected to regular maintenance, and also road surface states to be checked are mainly fine bumps and holes in the road surface, cracks, ice and wetness. Large holes in the road surface, rocks sticking out from the road surface, large trees growing from the road surface and the like are not included in the detection targets. However, for off-road vehicles, which travel on undeveloped land off the road, that is, on the off-road ground, many bumps/holes and obstacles that are not present on roads are to be taken into consideration. Furthermore, there are also off-road vehicle races in which off-road vehicles travel over large rocks and holes, and racers need to drive off-road vehicles while searching for large rocks and holes for training for races. Such an off-road vehicle cannot employ a conventional system for checking the road surface state of a road.

In view of the above-described circumstances, an off-road vehicle that travels on the off-road ground while checking the ground state, and a ground management system using the off-road vehicle are in demand.

SUMMARY OF THE INVENTION

According to the present invention, an off-road vehicle that travels on the off-road ground includes: a satellite positioning module configured to output positioning data; an actual vehicle position calculation unit configured to calculate an actual vehicle position based on the positioning data; a sensor group configured to detect unevenness (roughness) of the ground; a camera configured to capture the unevenness of the ground; a ground unevenness degree calculation unit configured to calculate a ground unevenness degree indicating an unevenness degree of the ground based on an input parameter; an input parameter setting unit configured to set, as the input parameter, data selected from among data detected by the sensor group and image data captured by the camera; an unevenness-position data generation unit configured to associate the actual vehicle position with the ground unevenness degree to generate ground unevenness-position data; and a data storage unit configured to store the ground unevenness-position data.

According to the configuration, the off-road vehicle selects, from among data detected by the sensor group for detecting unevenness of the ground and image data captured by the camera, data that matches the condition of the ground, sets the selected data as an input parameter or sets a plurality of pieces of data weighted according to the condition of the ground as input parameters, and calculates the ground unevenness degree indicating the unevenness degree of the ground. Since there are various types of ground states of the off-road ground, in contrast to road surface states of a road, it is important that data that matches the off-road ground on which the vehicle is to travel can be selected as an input parameter. The calculated ground unevenness degree is associated with the actual vehicle position at which this ground unevenness degree is detected, so as to serve as ground unevenness-position data indicating the ground unevenness degree at each travel position. As a result of the ground unevenness-position data being stored, pieces of data for use in checking the distribution of ground unevenness degrees along the track of travel of the off-road vehicle are accumulated, and can be used for the next instance of travel.

Furthermore, if an extremely dangerous hole or obstacle is detected, then it is possible to announce its position and ground condition.

Data suitable for calculation of the ground unevenness degree including a travel obstacle varies depending on the ground state of the off-road ground. For example, a sensor such as one for detecting a distance between the vehicle and the ground is suited for use for ground in which holes, rocks and the like that the vehicle can drive over are scattered, and an inclination sensor or an acceleration sensor is suited for use for ground in which rocky places such as those that can be climbed by the vehicle are scattered. Also, a camera is suited for use for ground in which travel obstacles such as trees or rocks are scattered. Accordingly, in one preferable embodiment, the sensor group may include at least one of a proximity sensor, an acceleration sensor and an inclination sensor.

Travel obstacles such as trees or rocks should be circumvented, and thus it is difficult to use a proximity sensor, an acceleration sensor, or an inclination sensor to detect the obstacles. However, travel obstacles such as trees or rocks that the vehicle cannot drive over can be detected relatively easily and rapidly by performing image processing on image data. Furthermore, simple bumps and holes in the ground as well can be accurately detected depending on the state thereof, by performing image processing on image data generated by the camera, and thus the ground unevenness degree thereof can be calculated. Accordingly, in one preferable embodiment, a ground analysis unit configured to generate, based on the image data, an analysis result indicating the ground unevenness degree that includes the presence of a travel obstacle on the ground may be provided.

In one preferable embodiment, an unevenness distribution map information generation unit configured to generate ground unevenness distribution map information based on the ground unevenness-position data accumulated through off-road travel may be provided. Accordingly, it is possible to generate a ground unevenness distribution map indicating the ground unevenness degrees (including the presence of an obstacle) along the track of travel taken by the off-road vehicle that travels freely on the off-road ground, and to use the generated ground unevenness distribution map as a guide for off-road travel.

As a result of the unevenness distribution map information being generated based on the ground unevenness-position data not in a stand-alone manner in the subject vehicle but cooperatively with other vehicles having the same function, it is advantageous that the unevenness distribution map information has ground unevenness degrees plotted more densely in a broader area. Accordingly, in one preferable embodiment, a communication unit configured to transmit the ground unevenness-position data to the outside via a communication line may be provided.

Furthermore, the present invention is also directed to a ground management system using the above-described off-road vehicle. In the ground management system using such an off-road vehicle, the off-road vehicle includes: a satellite positioning module configured to output positioning data; an actual vehicle position calculation unit configured to calculate an actual vehicle position based on the positioning data; a sensor group configured to detect unevenness of the ground; a camera configured to capture the unevenness of the ground; a ground unevenness degree calculation unit configured to calculate a ground unevenness degree indicating an unevenness degree of the ground based on an input parameter; an input parameter setting unit configured to set, as the input parameter, data selected from among data detected by the sensor group and image data captured by the camera; and an unevenness-position data generation unit configured to associate the actual vehicle position with the ground unevenness degree to generate ground unevenness-position data.

Furthermore, a management computer that can exchange data with the off-road vehicle includes: an unevenness distribution map information generation unit configured to generate ground unevenness distribution map information based on the ground unevenness-position data transmitted from the off-road vehicle; and a map information supply unit configured to transmit, in response to a request from a user terminal, the ground unevenness distribution map information to the user terminal. Also in this ground management system, similar to the above-described off-road vehicle, the ground unevenness degrees that match even various ground states relative to road surface states of a road can be calculated, and the resultant ground unevenness distribution map information can be shared between many off-road vehicles.

DETAILED DESCRIPTION OF PREFERRED EMBODIMENTS

Hereinafter, one embodiment of the off-road vehicle and the ground management system according to the present invention will be described with reference to the drawings. In the embodiment, the off-road vehicle is a vehicle that is referred to as a utility vehicle (UV), and is configured to travel smoothly on the off-road ground (such as undeveloped land or a rocky place).

Overall Configuration

Figure 1:
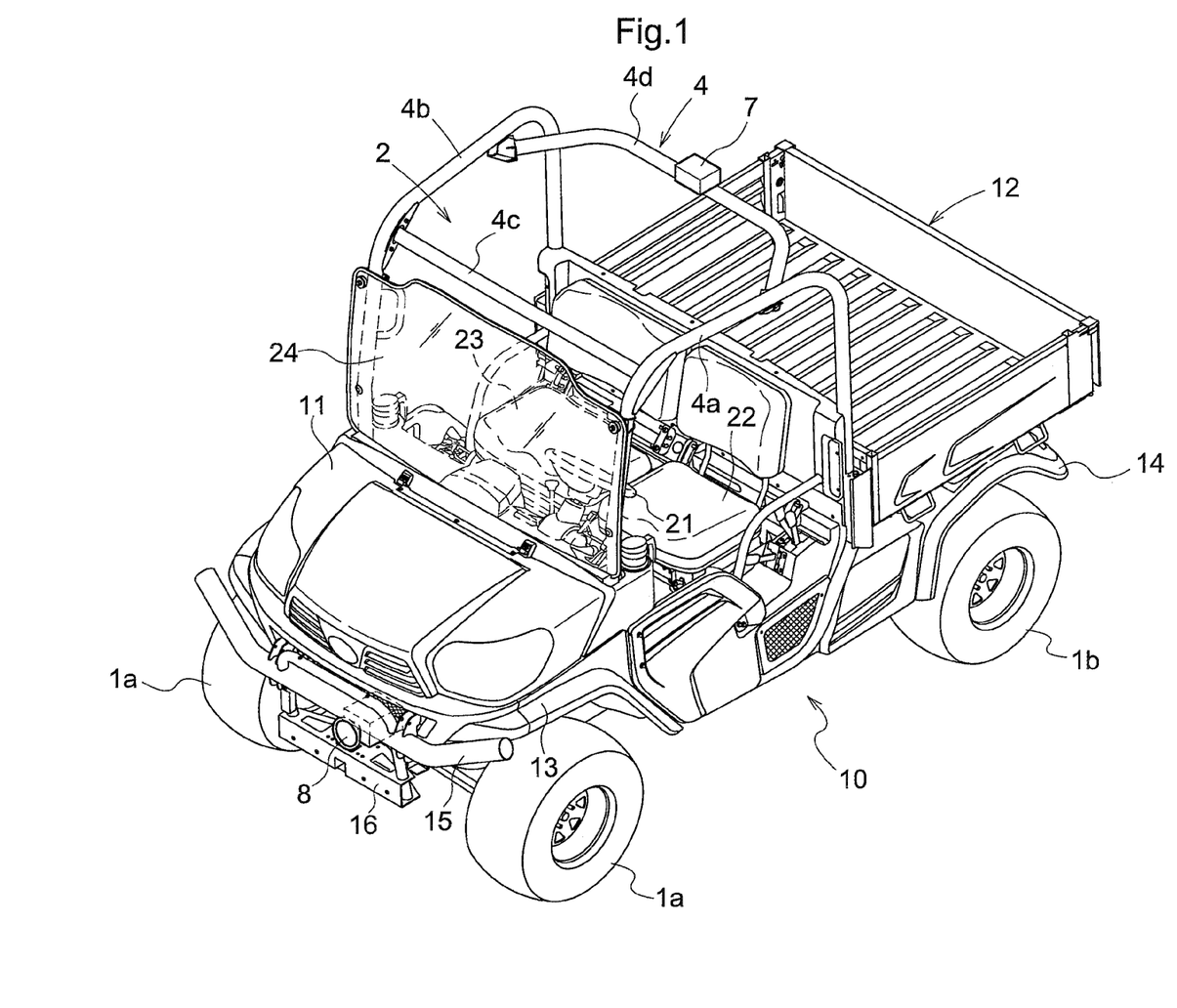
FIG. 1 is a perspective view illustrating a utility vehicle (UV) that is an example of an off-road vehicle according to one embodiment.
Figure 2:
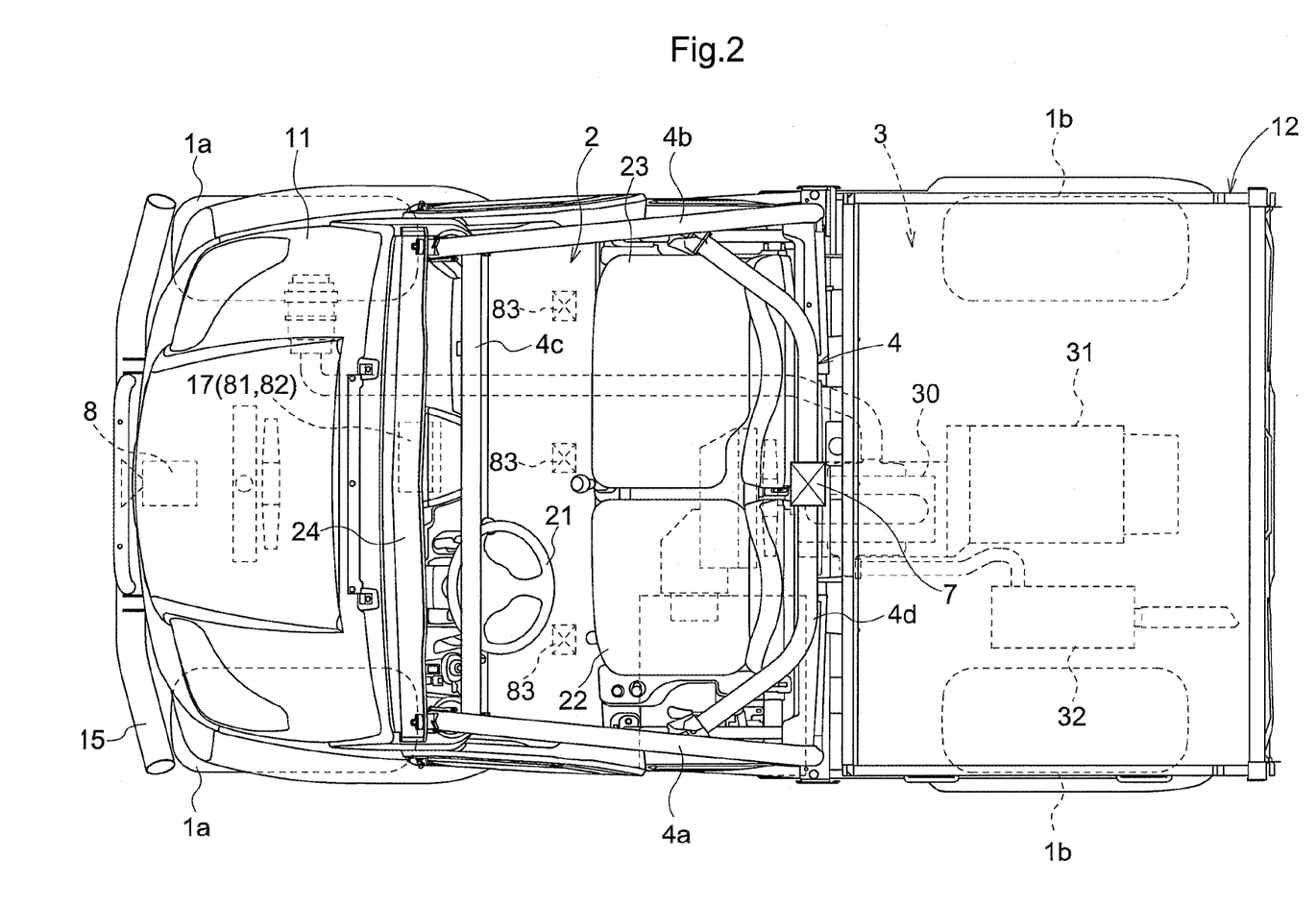
FIG. 2 is a plan view of the UV.

FIG. 1 is a perspective view of the UV, and FIG. 2 is a plan view of the UV. This UV is a four-wheel drive vehicle. A vehicle body 10 of a pipe frame construction is supported by a pair of right and left steerable front wheels 1a and a pair of right and left steerable rear wheels 1b. A cabin 2 is formed in the center of the vehicle body 10. A hood 11 is provided in front of the cabin 2, and a luggage platform 12 is provided behind the cabin 2. Front fenders 13 are provided extending from the right and left sides of the hood 11 and covering the upper portions of the front wheels 1a, and rear fenders 14 made of a synthetic resin are provided for covering the upper portions of the right and left rear wheels 1b. A guard bar 15 is provided via a guard bracket 16 at the front end of the vehicle body 10.

In the cabin 2, a steering wheel 21 for steering and controlling the front wheels 1a is arranged, a driving seat 22 is arranged behind the steering wheel 21, and a passenger seat 23 is arranged beside the driving seat 22. A windshield 24 is attached in front of the driving seat 22 and the passenger seat 23.

As shown in FIG. 2, an engine room 3 is formed below the luggage platform 12, and includes an engine 30, a transmission 31, a muffler 32 and the like, which are shown by dotted lines. The transmission 31, which transmits the driving force from the engine 30 to the front wheels 1a and the rear wheels 1b, is arranged behind the engine 30. The transmission 31 is constituted by an infinite variable-speed drive that is here a hydro-static transmission (HST), and a gearshifter. The gearshifter includes a multiple gearshift mechanism, a rear wheel differential mechanism and the like.

As shown in FIG. 1, the cabin 2 is constituted by a rollover protection structure (ROPS) frame assembly 4 made of round pipes. The ROPS frame assembly 4 includes a left frame portion 4a, a right frame portion 4b, a front cross bar 4c and a rear cross bar 4d. The left frame portion 4a and the right frame portion 4b have a gate shape. The front cross bar 4c connects the front upper end of the left frame portion 4a to the front upper end of the right frame portion 4b, and the rear cross bar 4d connects the rear upper end of the left frame portion 4a to the rear upper end of the right frame portion 4b.

The guard bracket 16 includes a camera 8 in a way such that it is guarded by the guard bar 15. The camera 8 captures unevenness or roughness (including an obstacle such as a tree growing from the ground or a rock placed on the ground) of the ground on which the UV travels, and outputs image data. As shown in FIG. 2, a control box 17 is arranged in a front end region of the cabin 2 to contain an acceleration sensor 81 and an inclination sensor 82. The acceleration sensor 81 detects the movement of the vehicle body 10, in particular the movement in the vertical direction, and a signal detected thereby is suitably used as a signal for detecting the unevenness of the ground. The inclination sensor 82 detects the inclination of the vehicle body when the vehicle body 10 drives over a bump on the ground or falls in a hole in the ground, and a signal detected thereby is also suitably used as a signal for detecting the unevenness of the ground. Furthermore, a plurality of proximity sensors 83 are provided at the center of the lower portion of the vehicle body 10 at intervals in the traverse direction of the vehicle body. The proximity sensors 83 measure the distance to the ground using ultrasonic waves and optical beams. Accordingly, signals detected by the proximity sensors 83 are suitably used as signals for detecting the unevenness of the ground that the UV can drive over.

Control System

Figure 3:
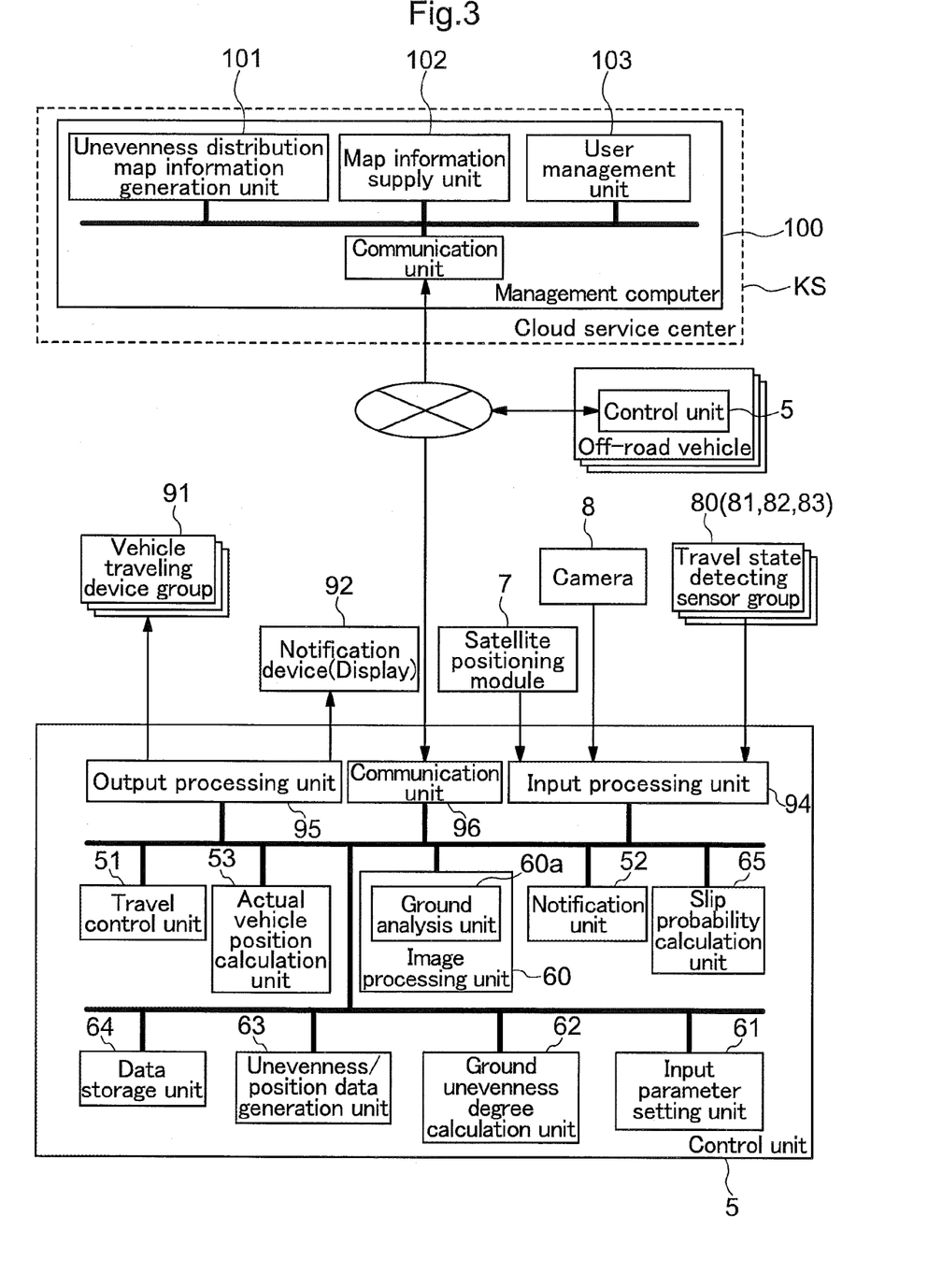
FIG. 3 is a functional block diagram illustrating a control system configured in the UV.

FIG. 3 illustrates a control system configured in the UV. A control unit 5, which is an essential element of the control system, includes an output processing unit 95, an input processing unit 94 and a communication unit 96, which function as input/output interfaces.

The output processing unit 95 is connected to a vehicle traveling device group 91, a notification device 92 and the like. The vehicle traveling device group 91 includes devices to be controlled in order for the vehicle to travel, such as the engine 30 and the transmission 31. The notification device 92 includes a display for displaying various types of information, and a buzzer, a speaker or a lamp that gives, in the case of danger, a warning to avoid the danger. The communication unit 96 functions to transmit data processed in the control unit 5 to a management computer 100 configured in a cloud service center KS (denoted by a dotted line in FIG. 3) in a remote place, and receive various types of data from the management computer 100.

The input processing unit 94 is connected to a satellite positioning module 7, the camera 8 and a travel state detecting sensor group 80 which is one of sensor groups. The travel state detecting sensor group 80 includes the acceleration sensor 81, the inclination sensor 82 and the proximity sensors 83. Furthermore, the travel state detecting sensor group 80 also includes sensors for detecting the number of rotations of the engine, the number of rotations of the rear wheels, the gear state of transmission 31 and the like, although they are not shown.

The control unit 5 includes a travel control unit 51, a notification unit 52 and an actual vehicle position calculation unit 53. The travel control unit 51 controls the vehicle traveling device group 91 in accordance with an operation made by the driver. The notification unit 52 generates information to be given to the driver. For example, if the presence of a travel obstacle is detected, the notification unit 52 gives the driver a warning to avoid danger via the notification device 92. The actual vehicle position calculation unit 53 calculates the actual vehicle position based on positioning data from the satellite positioning module 7 that employs a GPS (global positioning system) or the like.

The control unit 5 further includes an image processing unit 60, an input parameter setting unit 61, a ground unevenness degree calculation unit 62, an unevenness-position data generation unit 63, a data storage unit 64 and a slip probability calculation unit 65, which serve as control functional units that manage the ground state.

The image processing unit 60 processes image data of the ground in travel captured by the camera 8. The image processing unit 60 not only has commonly-known image processing functions such as level adjustment and edge detection, but also includes here a ground analysis unit 60a, which is a group of image processing units for analyzing the ground state. The ground analysis unit 60a has the functions of detecting a bump or hole in the ground, and detecting a travel obstacle such as a tree or rock standing from the ground, and outputs, as a result of analysis, ground unevenness data, which is data related to the bump or hole, or the obstacle.

Figure 4:
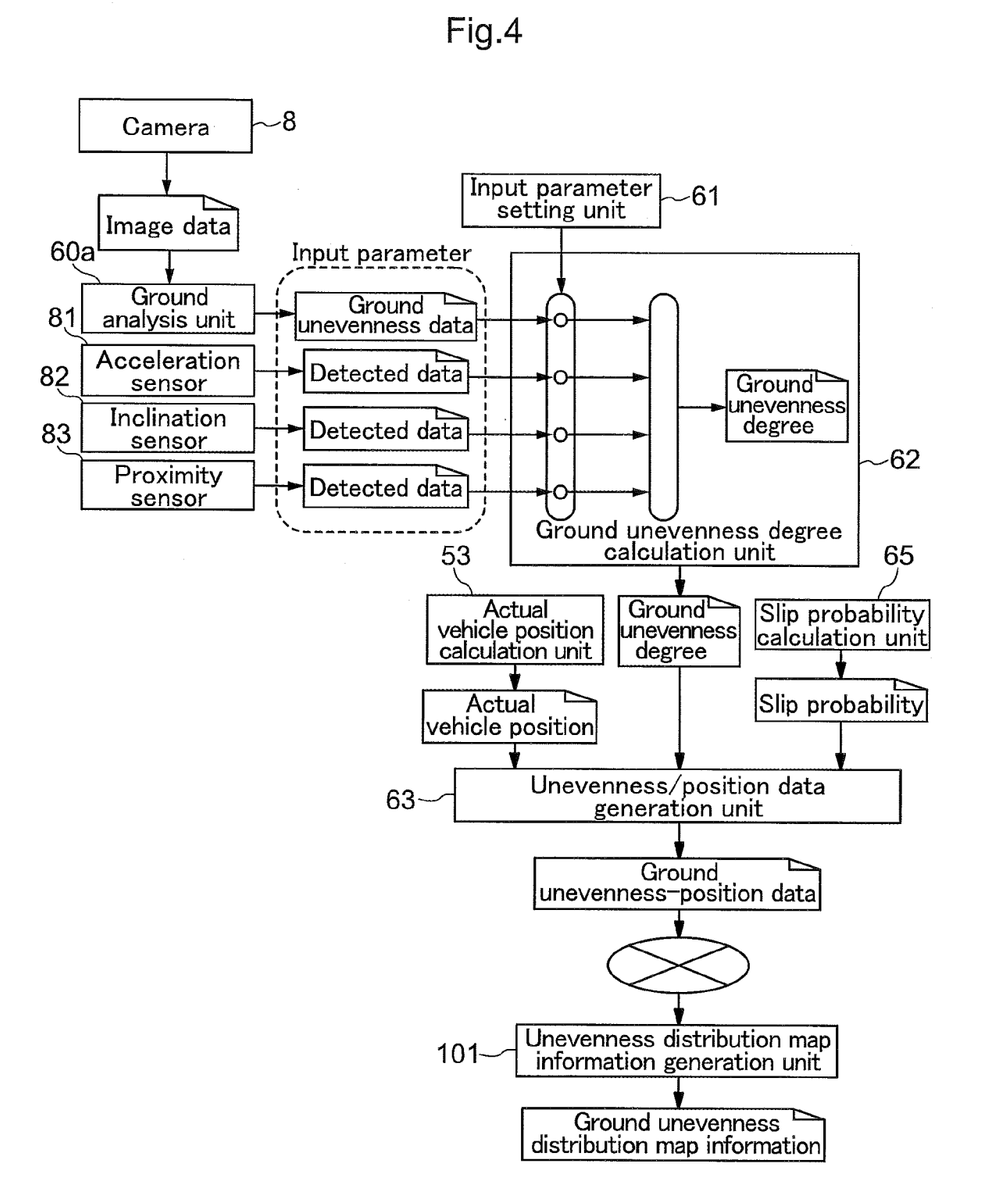
FIG. 4 is a diagram illustrating a flow of control data for managing the unevenness state of the off-road ground.

The ground unevenness degree calculation unit 62 calculates the ground unevenness degree indicating the unevenness degree of the ground based on an input parameter. As shown in FIG. 4, the input parameters are signals (data) converted into internal data based on the ground unevenness data from the ground analysis unit 60*a*, and on data detected from the acceleration sensor 81, the inclination sensor 82 and the proximity sensors 83. The sensors have different detection capabilities. For example, data detected by the proximity sensors 83 is usable for a relatively small bump or hole such as one that the vehicle body 10 can drive over, and data detected by the inclination sensor 82 is usable for a large bump or hole such as one that the vehicle body 10 can ascend or descend. If the periodicity/frequency between uneven elements is short, then data detected by the acceleration sensor 81 is usable. Ground unevenness data, which is data detected by the camera 8, is usable for a large bump or hole, but is not usable for ground where tall plants grow. Accordingly, the input parameter setting unit 61 sets, as an input parameter, data regarded as suitable that is selected from among three types of data detected from the sensor group (including the acceleration sensor 81, the inclination sensor 82 and the proximity sensors 83) and ground unevenness data based on image data captured by the camera 8. At this time, only a single piece of data may be set, or a plurality of pieces of data may be set. If a plurality of pieces of data are set as input parameters, the input parameters may preferably be weighted or prioritized. The setting of the input parameter setting unit 61 may be performed manually using a selection button, or previous parameters may be set automatically if the place is a place where the vehicle has previously traveled.

The unevenness-position data generation unit 63 associates the actual vehicle position calculated by the actual vehicle position calculation unit 53 with the ground unevenness degree calculated by the ground unevenness degree calculation unit 62 to generate ground unevenness-position data. The ground unevenness-position data will indicate the ground unevenness degree at a specific position on a map.

The slip probability calculation unit 65 calculates a slip probability based on a difference between the computed travel distance calculated based on the circumferential velocity of the rear wheels 1*b*, and an actual travel distance calculated based on the actual vehicle position from the actual vehicle position calculation unit 53. The slip probability is available as data indicating the ground state, and thus in this embodiment, the slip probability is added to the ground unevenness-position data. The ground unevenness-position data generated by the unevenness-position data generation unit 63 is successively stored in the data storage unit 64.

Ground Management System

In this embodiment, the management computer 100 is arranged in the cloud service center KS installed in a remote place, to manage the ground state of the off-road ground. The management computer 100 includes an unevenness distribution map information generation unit 101, a map information supply unit 102 and a user management unit 103.

The unevenness distribution map information generation unit 101 deploys, on a map, ground unevenness-position data transmitted from the off-road vehicle via a communication line (such as the Internet or a mobile telephone line), and generates ground unevenness distribution map information to be accumulated therein. The map information supply unit 102 functions similar to a web server; and in response to a request from the off-road vehicle, transmits the ground unevenness distribution map information to the off-road vehicle via the communication line. The user management unit 103 manages users registered to a cloud service for providing a road surface state to off-road vehicles.

The ground unevenness distribution map information supplied by the map information supply unit 102 is generated based on ground unevenness-position data transmitted by the users (off-road vehicles) registered to the cloud service that provides a road surface state, and thus the driver of an off-road vehicle during travel can be notified by the notification device 92 of the unevenness state of the ground in an area in which the driver has not yet traveled. The notification unit 52 can also give the driver a warning, if it is determined that unevenness in the ground including a dangerous travel obstacle is present in the travel destination, based on the ground unevenness distribution map information received from the map information supply unit 102 and on the travel direction of the vehicle.

OTHER EMBODIMENTS (1) In the foregoing embodiment, the control unit 5 included in the off-road vehicle receives and uses the cloud service for providing a road surface state from the management computer 100. Instead thereof, a user terminal independent of the off-road vehicle may receive and use the cloud service for providing the road surface state. In this case, data exchange between the user terminal of the driver or a fellow passenger and the off-road vehicle is performed via wireless data communication or wired data communication.

(2) Furthermore, the above-described ground management system may also be constituted by an off-road vehicle, a user terminal and a management computer 100. In this case, the off-road vehicle includes a satellite positioning module 7, an actual vehicle position calculation unit 53, a travel state detecting sensor group 80, a camera 8, a ground unevenness degree calculation unit 62, an input parameter setting unit 61 and an unevenness-position data generation unit 63. The management computer 100 includes: an unevenness distribution map information generation unit 101 that generates ground unevenness distribution map information based on ground unevenness-position data transmitted from the off-road vehicle via the user terminal; and a map information supply unit 102 that transmits the ground unevenness distribution map information to the user terminal in response to a request from the user terminal. The user terminal displays the ground unevenness distribution map information.

(3) In the foregoing embodiment, the acceleration sensor 81, the inclination sensor 82 and the proximity sensors 83 serve as sensors for detecting the unevenness state of the off-road ground, but the present invention is not limited thereto. Any sensor may be used in place of or together with these sensors as long as it can detect the unevenness state of the ground.

(4) The segmentation of the functional units in the functional block diagram as shown in FIG. 3 is only an example mainly for the purpose of illustration, and the integration of various functional units or division of a single functional unit into a plurality of subunits may be done suitably. Particularly, the unevenness distribution map information generation unit 101 may be formed in the control unit 5 of the off-road vehicle while serving as a functional unit for generating unevenness distribution map information dedicated for this vehicle.

What is claimed is:

1. An off-road vehicle configured to travel on the off-road ground, comprising:
    a satellite positioning module configured to output positioning data;
    an actual vehicle position calculation unit configured to calculate an actual vehicle position based on the positioning data;
    a sensor group configured to detect unevenness of the ground;
    a camera configured to capture the unevenness of the ground;
    a ground unevenness degree calculation unit configured to calculate a ground unevenness degree indicating an unevenness degree of the ground based on an input parameter;
    an input parameter setting unit configured to set, as the input parameter, data selected from among data detected by the sensor group and image data captured by the camera;
    an unevenness-position data generation unit configured to associate the actual vehicle position with the ground unevenness degree to generate ground unevenness-position data;
    a data storage unit configured to store the ground unevenness-position data; and
    a slip probability calculation unit configured to calculate a slip probability of the vehicle based on a difference between a computed travel distance and an actual travel distance, the computed travel distance being calculated based on a circumferential velocity of a wheel of the vehicle, and the actual travel distance being calculated based on the actual vehicle position that is calculated by the actual vehicle position calculation unit,
    wherein the sensor group includes an inclination sensor configured to detect unevenness of the ground by detecting inclination of a vehicle body, and a proximity sensor configured to detect smaller unevenness of the ground than the unevenness detected by the inclination sensor.

2. The off-road vehicle according to claim 1, wherein the sensor group further includes an acceleration sensor configured to detect unevenness of the ground by detecting movement of the vehicle body in a vertical direction.

3. The off-road vehicle according to claim 1, further comprising a ground analysis unit configured to generate, based on the image data, an analysis result indicating the ground unevenness degree that includes the presence of a travel obstacle on the ground.

4. The off-road vehicle according to claim 1, further comprising an unevenness distribution map information generation unit configured to generate ground unevenness distribution map information based on the ground unevenness-position data accumulated through off-road travel.

5. The off-road vehicle according to claim 1, further comprising a communication unit configured to transmit the ground unevenness-position data to the outside via a communication line.

6. A ground management system using an off-road vehicle that travels on the off-road ground, the off-road vehicle comprising:
    a satellite positioning module configured to output positioning data;
    an actual vehicle position calculation unit configured to calculate an actual vehicle position based on the positioning data;
    a sensor group configured to detect unevenness of the ground;
    a camera configured to capture the unevenness of the ground;
    a ground unevenness degree calculation unit configured to calculate a ground unevenness degree indicating an unevenness degree of the ground based on an input parameter;
    an input parameter setting unit configured to set, as the input parameter, data selected from among data detected by the sensor group and image data captured by the camera;
    an unevenness-position data generation unit configured to associate the actual vehicle position with the ground unevenness degree to generate ground unevenness-position data; and
    a slip probability calculation unit configured to calculate a slip probability of the vehicle based on a difference between a computed travel distance and an actual travel distance, the computed travel distance being calculated based on a circumferential velocity of a wheel of the vehicle, and the actual travel distance being calculated based on the actual vehicle position that is calculated by the actual vehicle position calculation unit,
    wherein the ground management system comprises:
        an unevenness distribution map information generation unit configured to generate ground unevenness distribution map information based on the ground unevenness-position data transmitted from the off-road vehicle; and
        a map information supply unit configured to transmit, in response to a request from a user terminal, the ground unevenness distribution map information to the user terminal, and
    wherein the sensor group includes an inclination sensor configured to detect unevenness of the ground by detecting inclination of a vehicle body, and a proximity sensor configured to detect smaller unevenness of the ground than the unevenness detected by the inclination sensor.

7. The off-road vehicle according to claim 1, wherein a plurality of the proximity sensors are provided at a lower portion of the vehicle body at intervals in a traverse direction of the vehicle body.

8. The ground management system according to claim 6, wherein a plurality of the proximity sensors are provided at a lower portion of the vehicle body at intervals in a traverse direction of the vehicle body.

* * * * *